United States Patent
Yamashita

(10) Patent No.: US 10,493,659 B2
(45) Date of Patent: Dec. 3, 2019

(54) TIRE DISMANTLING METHOD

(71) Applicant: BRIDGESTONE CORPORATION, Chuo-ku, Tokyo (JP)

(72) Inventor: Hiromasa Yamashita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 190 days.

(21) Appl. No.: 15/121,043

(22) PCT Filed: Feb. 23, 2015

(86) PCT No.: PCT/JP2015/055022
§ 371 (c)(1),
(2) Date: Aug. 24, 2016

(87) PCT Pub. No.: WO2015/129621
PCT Pub. Date: Sep. 3, 2015

(65) Prior Publication Data
US 2017/0008196 A1    Jan. 12, 2017

(30) Foreign Application Priority Data
Feb. 26, 2014 (JP) .................. 2014-035586

(51) Int. Cl.
*B29B 17/02* (2006.01)
*B29L 30/00* (2006.01)

(52) U.S. Cl.
CPC ...... *B29B 17/02* (2013.01); *B29B 2017/0203* (2013.01); *B29B 2017/0217* (2013.01); *B29L 2030/00* (2013.01)

(58) Field of Classification Search
CPC ............ B29B 17/02; B29B 2017/0203; B29B 2017/0217; B60C 9/18; B60C 5/01; Y02W 30/622; B29L 2030/00; B02C 4/02
See application file for complete search history.

(56) References Cited

U.S. PATENT DOCUMENTS

| | | | |
|---|---|---|---|
| 4,840,316 A | 6/1989 | Barclay | |
| 5,235,888 A | 8/1993 | Dom | |

(Continued)

FOREIGN PATENT DOCUMENTS

| | | | |
|---|---|---|---|
| CN | 1086165 A | 5/1994 | |
| JP | H03-143701 A | 6/1991 | |

(Continued)

OTHER PUBLICATIONS

Search Report of the Chinese Office Action dated Jun. 16, 2017.

*Primary Examiner* — Christopher J Besler
*Assistant Examiner* — Christine Pellazar Bersabal
(74) *Attorney, Agent, or Firm* — Solaris Intellectual Property Group, PLLC

(57) ABSTRACT

A tire dismantling method is provided that is capable of dismantling a reinforcing member from a tire in which a thermoplastic material and the reinforcing member are an integral unit. The dismantling method is of a tire including a tire frame member formed of a thermoplastic resin, and a reinforcing member laid up at a tire radial direction outside of the tire frame member and formed of a material with a higher rigidity than the tire frame member. The tire dismantling method includes an opening-out process of cutting the tire along a width direction to make the tire into a belt shape, and a reinforcing member separation process of crushing the belt shaped tire to separate the tire frame member and the reinforcing member.

4 Claims, 7 Drawing Sheets

(56) References Cited

U.S. PATENT DOCUMENTS

| | | |
|---|---|---|
| 5,735,471 A | 4/1998 | Muro |
| 6,168,103 B1 | 1/2001 | Agostinelli et al. |
| 6,722,593 B1 | 4/2004 | Dobozy |
| 2001/0047585 A1* | 12/2001 | Agostinelli ............ B26D 3/005 29/797 |
| 2002/0088557 A1 | 7/2002 | Agostinelli |
| 2011/0297283 A1* | 12/2011 | Kouno .................. B60C 1/0025 152/209.1 |
| 2013/0150467 A1 | 6/2013 | Kouno et al. |

FOREIGN PATENT DOCUMENTS

| | | |
|---|---|---|
| JP | H11-513614 A | 11/1999 |
| JP | 2002-528305 A | 9/2002 |
| JP | 2003-534956 A | 11/2003 |
| JP | 2013-14065 A | 1/2013 |
| RU | 2504469 C1 | 1/2014 |
| WO | 94/07670 A | 4/1994 |

\* cited by examiner

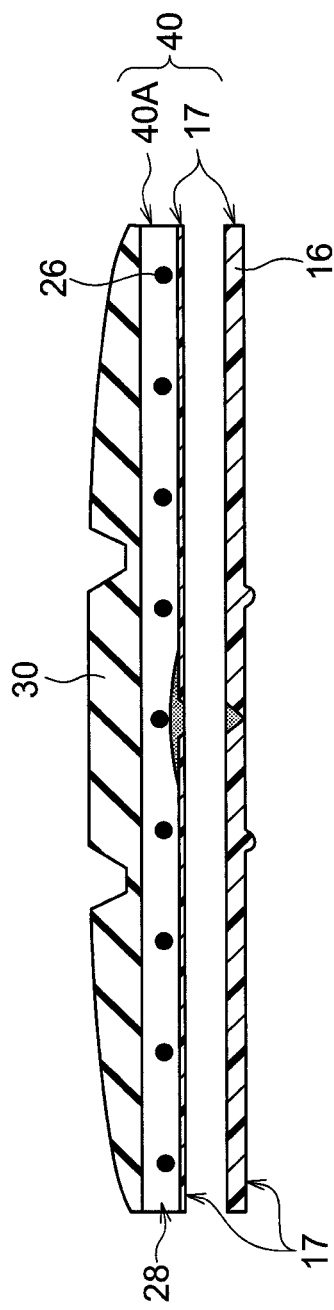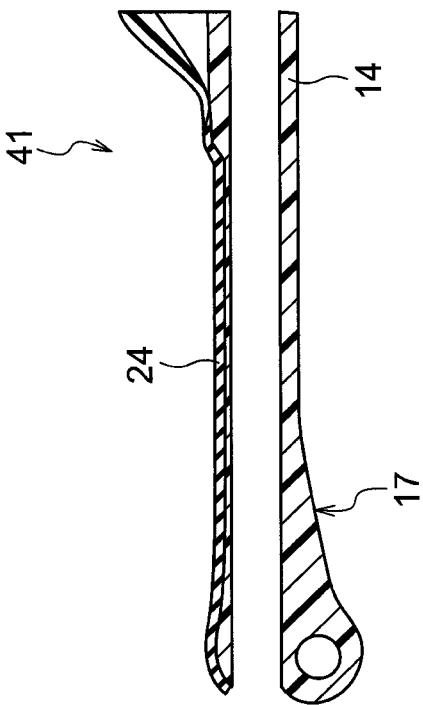

TIRE DISMANTLING METHOD

TECHNICAL FIELD

The present invention relates to a tire dismantling method.

BACKGROUND ART

In recent years, there has been a demand to employ thermoplastic resins, thermoplastic elastomers, and the like as tire materials from the perspectives of weight reduction and ease of recycling. Japanese Patent Application Laid-Open (JP-A) No. H03-143701, for example, describes a tire molded using a thermoplastic polymer material.

SUMMARY OF INVENTION

Technical Problem

In the pneumatic tire described in JP-A No. H03-143701, a tire main body formed of thermoplastic material, a reinforcing member made of metal, and a tread rubber are integrated together by vulcanization. No conventional method exists to dismantle tires by material for this kind of pneumatic tire. Thus, when recycling, the only option is thermal recycling by incinerating the tire similarly to conventional pneumatic tires made of rubber. It is therefore desirable to separate and dismantle the integrated thermoplastic material, rubber, and metal, and to recycle them as materials by material recycling.

In consideration of the above circumstances, an object of the present invention is to provide a tire dismantling method capable of dismantling a reinforcing member from a tire in which a thermoplastic material and the reinforcing member have been integrated together.

Solution to Problem

A tire dismantling method of a first aspect of the present invention is a dismantling method of a tire including a tire frame member formed of a thermoplastic resin, and a reinforcing member laid up at a tire radial direction outside of the tire frame member and formed of a material with a higher rigidity than the tire frame member. The tire dismantling method includes an opening-out process of cutting the tire along a width direction to make the tire into a belt shape, and a reinforcing member separation process of crushing the belt shaped tire to separate the tire frame member and the reinforcing member.

In the above configuration, the three dimensional tire with a curved surface is made into a belt shape, thereby enabling the tire to be easily crushed, and enabling the reinforcing member to be easily dismantled from the tire frame member.

A tire dismantling method of a second aspect of the present invention further includes a pressing process of pressing the belt shaped tire into a plate shape. In the reinforcing member separation process, the tire frame member and the reinforcing member are separated from each other by using metal rollers set with a narrower spacing than a plate thickness of the tire frame member to crush the tire frame member of the tire that has been pressed into a plate shape.

In the above configuration, making the tire into a plate shape enables the tire to be inserted between the metal rollers. The spacing between the metal rollers is set narrower than the plate thickness of the tire frame member, thereby enabling the tire frame member to be crushed by the metal rollers and the reinforcing member alone to be extracted.

In a tire dismantling method of a third aspect of the present invention, the spacing between the metal rollers is wider than a thickness of the reinforcing member, and is from 2% to 20% of the plate thickness of the tire frame member.

In the above configuration, the spacing between the metal rollers is set much narrower than the plate thickness of the tire frame member, at from 2% to 20% thereof. This enables the tire frame member to be reliably crushed. However, the spacing between the metal rollers is wider than the thickness of the reinforcing member, thereby enabling the reinforcing member to be extracted with its shape maintained.

In a tire dismantling method of a fourth aspect of the present invention, the tire further includes a rubber layer that is vulcanization bonded to an outer face of the tire frame member, and the tire dismantling method further includes a rubber layer separation process of, prior to the reinforcing member separation process, compressing the tire so as to separate the tire frame member and the rubber layer.

In the above configuration, even in cases in which the rubber layer is vulcanization bonded to the outer face of the tire frame member, the reinforcing member can be easily separated from the tire frame member by first compressing and separating the rubber layer.

In a tire dismantling method of a fifth aspect of the present invention, the reinforcing member is a bead or a cord made of metal.

In the above configuration, the bead or cord made of metal is separated from the tire frame member, thereby enabling the metal to be reused or recycled as material.

In a tire dismantling method of a sixth aspect of the present invention, an ambient temperature in the reinforcing member separation process is from 10° C. to 40° C.

In the above configuration, since the thermoplastic resin softens and becomes difficult to separate when heat is applied, softening of the thermoplastic resin is prevented by performing the reinforcing member separation process at what is referred to as room temperature, this being from 10° C. to 40° C., enabling the reinforcing member to be efficiently separated from the tire frame member.

Advantageous Effects of Invention

The present invention enables the provision of a tire dismantling method capable of dismantling a reinforcing member from a tire with integrated thermoplastic material and reinforcing member.

BRIEF DESCRIPTION OF DRAWINGS

FIG. 5A is a cross-section illustrating a tread portion of a tire that has been sliced by a slicer.

FIG. 5B is a cross-section illustrating a side portion of a tire that has been sliced by a slicer.

DESCRIPTION OF EMBODIMENTS

Explanation follows regarding an example of a tire dismantling method according to an exemplary embodiment of the present invention, with reference to FIG. 1 to FIG. 7.

Tire Configuration

Figure 1:
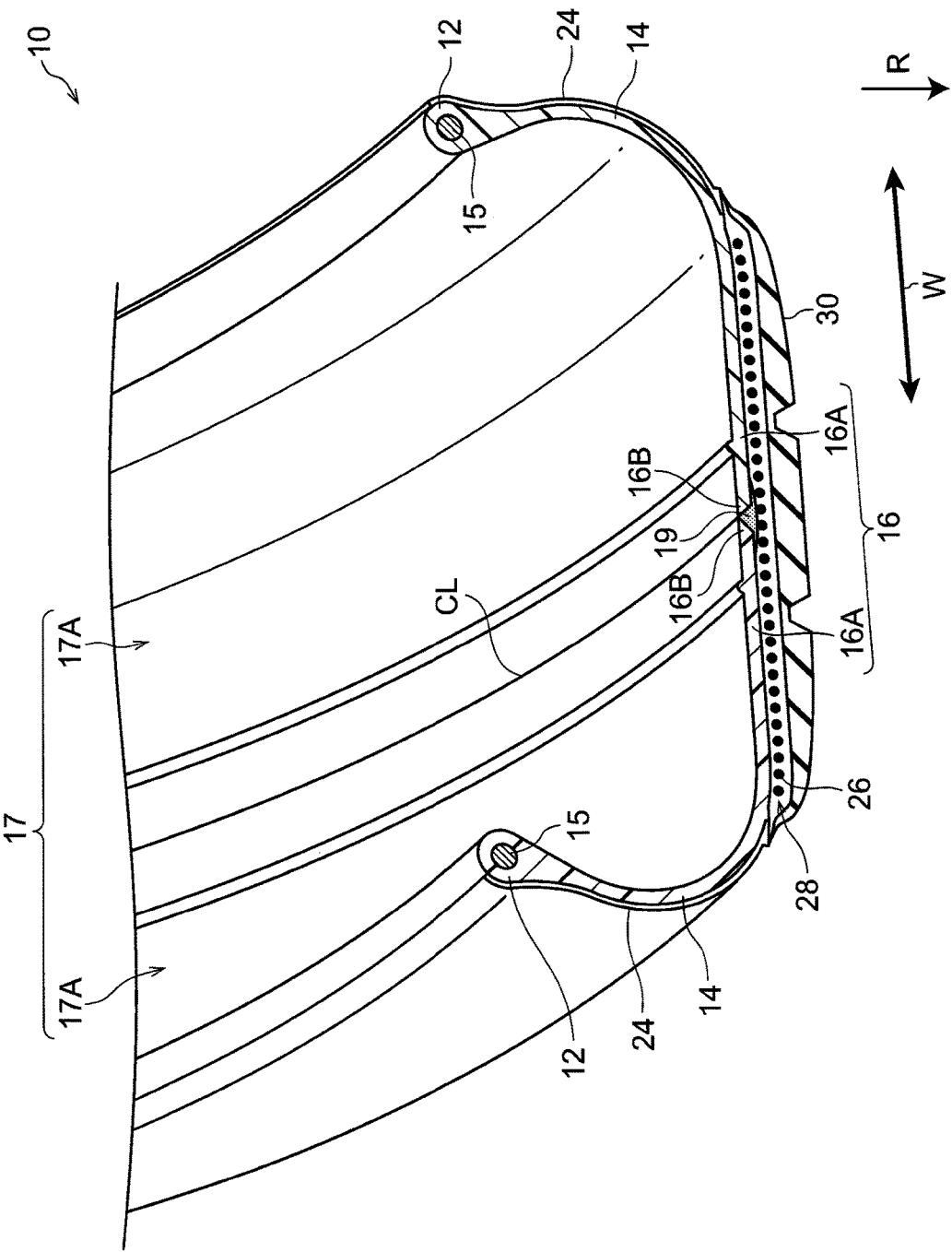
FIG. 1 is a perspective view illustrating a state in which part of a tire according to an exemplary embodiment of the present invention has been cross-sectioned along a tire radial direction.

In FIG. 1, a tire width direction running along a tire rotation axis is indicated by the letter W, a direction moving away from the tire rotation axis at right angles to the tire rotation axis is referred to as a tire radial direction and indicated by the letter R, and a plane passing through the center of the tire width direction W at right angles to the tire rotation axis is referred to as a tire equatorial plane and indicated by the letters CL.

As illustrated in FIG. 1, a tire 10 of the present exemplary embodiment is a pneumatic tire employed with air filled inside, and includes a tire frame member 17. The tire frame member 17 includes a pair of bead portions 12, a pair of side portions 14 extending from the respective bead portions 12 toward a tire radial direction R outside, and a crown portion 16 that couples respective tire radial direction R outside ends of the side portions 14 together.

The tire frame member 17 is formed of a pair of circular ring shaped tire frame half parts 17A, that each have the same shape as each other and are configured by molding a single bead portion 12, a single side portion 14, and a half-width crown half portion 16A together as an integral unit. A leading end 16B of each crown half portion 16A is formed with a sloped face on the tire equatorial plane CL side, and the pair of leading ends 16B form a taper.

The pair of tire frame half parts 17A abut each other at leading ends 16B of the crown half portions 16A on the tire equatorial plane CL, and are bonded together using a thermoplastic welding material 19 to form the tire frame member 17.

The tire frame member 17 is formed of a thermoplastic resin. Thermoplastic resins are polymer compounds of materials that soften and flow with increased temperature, that adopt a relatively hard and strong state when cooled, and that do not have a rubber-like elasticity.

Examples of thermoplastic resins include polyolefin resins, polystyrene resins, polyamide resins, polyester resins, urethane resins, olefin resins, and vinyl chloride resins.

A material having a deflection temperature under load (at 0.45 MPa during loading), as defined by ISO 75-2 or ASTM D648, of 78° C. or greater, a tensile yield strength, as defined by JIS K7113, of 10 MPa or greater, a tensile elongation at break (JIS K7113), also as defined by JIS K7113, of 50% or greater, and a Vicat softening temperature, as defined by JIS K7206 (method A), of 130° C., for example, may be employed as the thermoplastic welding material 19. Note that the same thermoplastic resin as that employed for the tire frame member 17 may be employed for the thermoplastic welding material 19.

Each tire frame half part 17A formed using a thermoplastic resin may, for example, be molded by a method such as vacuum molding, pressure molding, injection molding, or melt casting, enabling the manufacturing process to be greatly simplified and enabling molding time to be reduced compared to cases in which the tire frame half part 17A is molded and vulcanized using rubber.

Note that the tire frame member 17 may be configured by a single thermoplastic resin, or may employ thermoplastic resins having different characteristics in each location of the tire frame member 17 (such as the side portions 14, the crown portion 16, and the bead portions 12), similarly to ordinary conventional pneumatic tires made of rubber, these locations being joined together.

Figure 2:
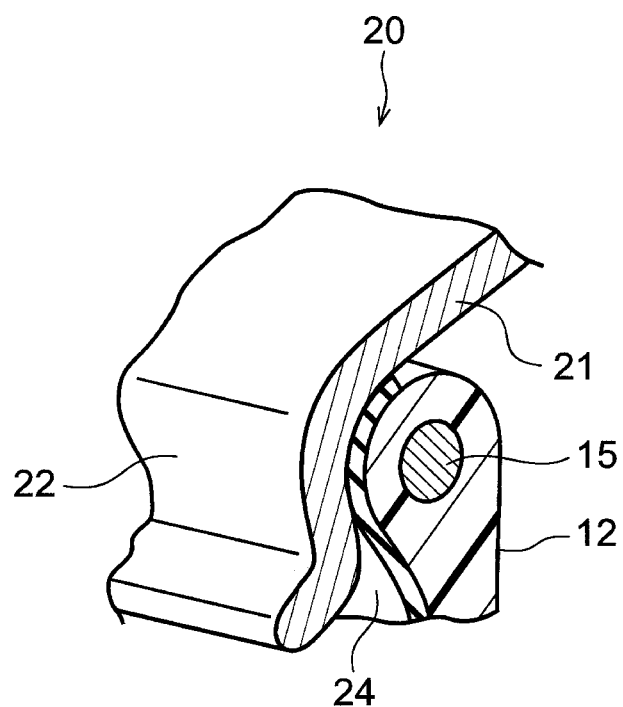
FIG. 2 is a perspective cross-section view illustrating a state in which a bead portion of a tire according to an exemplary embodiment of the present invention has been mounted to a rim.

As illustrated in FIG. 2, each of the pair of bead portions 12 is in close contact with a bead seat portion 21 and a rim flange 22 of a rim 20, so as to maintain the internal pressure of the tire filled with air. An annular shaped bead core 15 is embedded in each bead portion 12 of the tire frame member 17. The bead core 15 is formed of steel cord, similarly to in ordinary conventional pneumatic tires.

Note that the bead cores 15 may be omitted, as long as the rigidity of the bead portions 12 is secured, and there are no issues with fitting to the rim 20. The bead cores 15 may be formed of metal cord other than steel cord, organic fiber cord, cord made of resin-covered organic fibers, or the like. The bead cores 15 may alternatively be formed of a hard resin by injection molding or the like, rather than cord.

As illustrated in FIG. 1, a covering layer (rubber layer) 24 formed of rubber is formed from each bead portion 12 to the tire width direction W outside of the crown portion 16 on the tire frame member 17, and is vulcanization bonded to an outer face of the tire frame member 17. The same type of rubber as the rubber employed for bead portion outer faces of ordinary conventional pneumatic tires made of rubber is preferably employed as the rubber forming the covering layer 24.

At least a portion of a reinforcing layer 28, including cord (reinforcing member) 26 wound in a spiral shape, is laid up at the tire radial direction R outside of the crown portion 16 of the tire frame member 17. The reinforcing layer 28 corresponds to a belt disposed on an outer circumferential face of a carcass of a conventional pneumatic tires made of rubber. A material such as metal, with a higher rigidity than the thermoplastic resin forming the tire frame member 17, is employed as the cord 26, and steel cord made of twisted steel fibers is employed in the present exemplary embodiment.

The reinforcing layer 28 may be formed of the cord 26 alone, or may be formed in sheet form in which the cord 26 is covered by a thermoplastic resin. In the present exemplary embodiment, the reinforcing layer 28 is formed in sheet form in which the cord 26 is covered by the same type of thermoplastic resin as the tire frame member 17. The reinforcing layer 28 is laid up by bonding or welding part thereof to the tire frame member 17, so that the tire frame member 17 and the reinforcing layer 28 are integrated together.

A tread member (rubber layer) 30 is disposed at the tire radial direction outside of the crown portion 16 of the tire frame member 17, and is vulcanization bonded to the outer face of the tire frame member 17. The tread member 30 is disposed along the tire frame member 17, and configures a tire tread, this being a ground contact portion of the tire 10. The tread member 30 is laminated onto the tire frame member 17, with the reinforcing layer 28 interposed therebetween.

The tread member 30 is formed of a rubber having a superior wear resistance to the thermoplastic resin forming the tire frame member 17. The same type of rubber as the rubber employed in conventional pneumatic tires made of rubber may be employed as the rubber employed in the tread member 30.

Tire Dismantling Method

Explanation follows regarding a dismantling method and dismantling processes of the tire 10 of the present exemplary embodiment. First, in a bead extraction process, the bead cores 15 embedded in the bead portions 12 of the tire frame member 17 are gripped and pulled out by a chuck using bead extraction equipment, not illustrated in the drawings.

Figure 3:
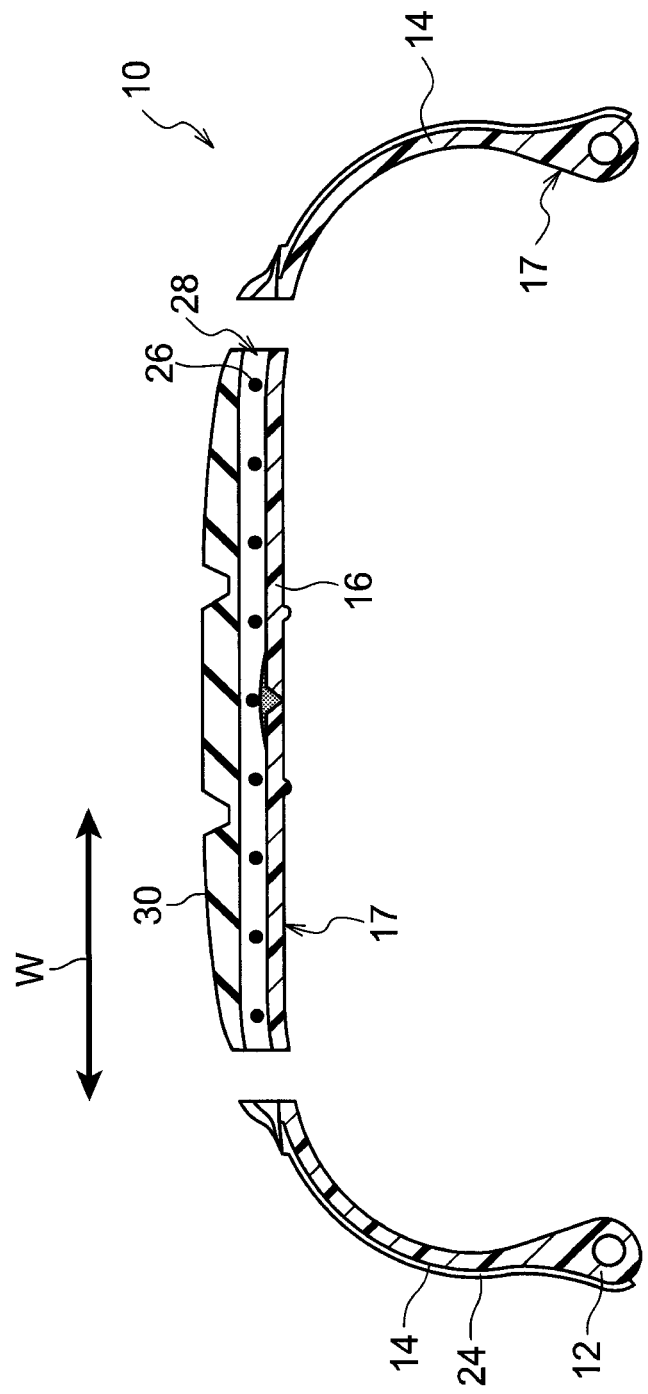
FIG. 3 is a cross-section taken along a tire radial direction, illustrating a state in which side portions of a tire according to an exemplary embodiment have been cut off.

Then, in a side cutting process, a circular disc cutter, disposed with its axis along the tire width direction W, of a tire cutting machine, not illustrated in the drawings, is moved in the tire radial direction R so as to approach and cut the tire 10 along the tire radial direction R while being rotated along the tire circumferential direction. Specifically, as illustrated in FIG. 3, the tire frame member 17 is cut at two locations, so as to be separated into the crown portion 16 and the pair of side portions 14. Note that the cut locations are not limited to between the crown portion 16 and the side portions 14, and the tire 10 may be cut along the tire radial direction R at three or more locations.

Next, in an opening-out process, the circular ring shaped tire 10 is cut along the tire width direction W, such that tire 10 is made into a belt shape. The tire 10 may be made into a belt shape by being cut at one location along the tire width direction W; however, the tire 10 may also be cut at plural locations to form plural tire pieces. Note that the tire 10 is cut at eight locations to form eight tire pieces in the present exemplary embodiment.

Figure 4:
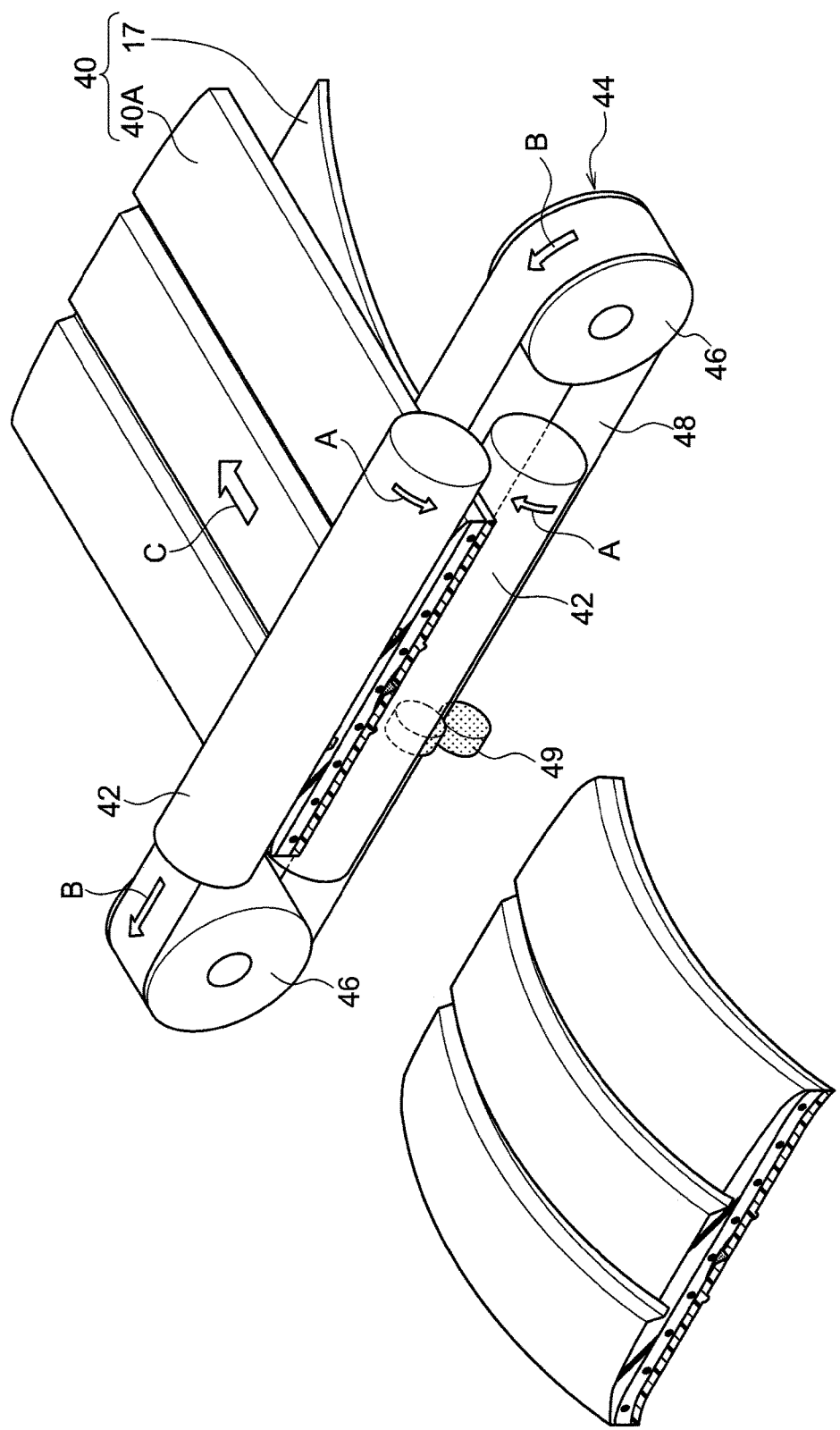
FIG. 4 is a perspective view illustrating a state in which a tire is being sliced by a slicer.

Explanation follows regarding a pressing process and a slicing process for a tire piece 40 of the crown portion 16 of the tire frame member 17 in FIG. 4, the tire piece 40 being one of the eight cut tire pieces.

As illustrated in FIG. 4, in the pressing process, the tire piece 40 that curves in the tire circumferential direction and tire width direction is clamped between a pair of guide rollers 42 and pressed into a plate shape. Specifically, a spacing between the pair of guide rollers 42 has the same dimension as, or a dimension that is slightly smaller than, the plate thickness of the tire piece 40, enabling the tire piece 40 to be pressed. The tire piece 40 is clamped between the guide rollers 42, and the guide rollers 42 are rotated in the arrow A directions, such that the tire piece 40 is pressed and straightened into a flat plate shape.

Then, the tire piece 40 that has been straightened into a flat plate shape is fed out from the guide rollers 42 in the arrow C direction, and sliced by a slicer 44 in the slicing process. The slicer 44 includes a pair of rotating drums 46, an endless band knife blade 48 spanning between the rotating drums 46, and a pair of whetstones 49 that sharpen the band knife blade 48.

The band knife blade 48 spans between the rotation-driven rotating drums 46, and rotates at high speed in the arrow B direction. The band knife blade 48 is constantly sharpened by the whetstones 49. The band knife blade 48 is rotated in a direction orthogonal to the feed-out direction of the tire piece 40, and slices the tire piece 40 along an interface of the tread member 30 with tire frame member 17.

Specifically, as illustrated in FIG. 5A, the fed-out tire piece 40 is sliced further toward the tire radial direction inside (the lower side in FIG. 5A) of the crown portion 16 of the tire frame member 17 than the reinforcing layer 28. Slicing further toward the lower side than the reinforcing layer 28 enables the tire piece 40 to be separated and dismantled into a tire piece 40A including materials such as rubber and steel, and the tire frame member 17 formed of a thermoplastic resin.

In order to prevent softening of the tire frame member 17 formed of thermoplastic resin, the ambient temperature in the slicing process of the tire piece 40 is regulated to be at what is referred to as room temperature, this being from 10° C. to 40° C. Note that, although the optimal ambient temperature is from 20° C. to 30° C., softening of the thermoplastic resin can be sufficiently prevented even at from 0° C. to 100° C.

Although the pressing process and slicing process of the tire piece 40 of the crown portion 16 of the tire frame member 17 have been explained above, a pressing process and a slicing process of a tire piece 41 of the side portions 14 of the tire frame member 17 are similar processes to those of the tire piece 40. Note that, as illustrated in FIG. 5B, since the reinforcing layer 28 is not laid up on the tire piece 41, the tire piece 41 is sliced by the band knife blade 48 further toward the tire radial direction inside (the lower side in FIG. 5B) than an interface of the covering layer 24 with the side portion 14 of the tire frame member 17. By slicing further toward the lower side than the interface, the tire frame member 17 formed of thermoplastic resin can be separated and dismantled from the tire piece 41 that includes rubber.

Note that various other dismantling methods were investigated before arriving at the dismantling method of thermoplastic resin with the above-described slicing process.

First, a dismantling method was tried in which the tire 10 was ground into a powder, then only the thermoplastic resin (tire frame member 17) was separated. Since the thermoplastic resin (tire frame member 17) and the rubber layer (tread member 30) are vulcanization bonded together, it was difficult to separate and dismantle the thermoplastic resin alone.

A dismantling method was also tried in which the thermoplastic resin (tire frame member 17) was sliced by a plane used for woodworking or a cutter used for meat or fish processing. The thermoplastic resin (tire frame member 17) came away from the rubber layer (tread member 30) partially and fragmented, such that the thermoplastic resin (tire frame member 17) could not be separated and dismantled from the rubber layer (tread member 30) in a state with its shape maintained.

A dismantling method was also tried in which the thermoplastic resin (tire frame member 17) was sliced by an ultrasonic cutter used for plastic machining. The thermoplastic resin (tire frame member 17) softened or melted under the frictional vibration heat of the cutter, and the thermoplastic resin (tire frame member 17) could not be separated and dismantled from the rubber layer (tread member 30) in a state with its shape maintained.

However, in the pressing method and the slicing method of the present exemplary embodiment, after the curved tire piece 40 has been pressed by the guide rollers 42 and straightened into a flat plate shape, the tire piece 40 is sliced by the band knife blade 48 rotating at high speed, thereby enabling the thermoplastic resin (tire frame member 17) to be separated and dismantled from the rubber layer (tread member 30) in a state with its shape maintained. Since, in contrast to an ultrasonic cutter, the endless band knife blade 48 does not generate frictional vibration heat, there is no concern of the thermoplastic resin (tire frame member 17) softening or melting.

Figure 6:
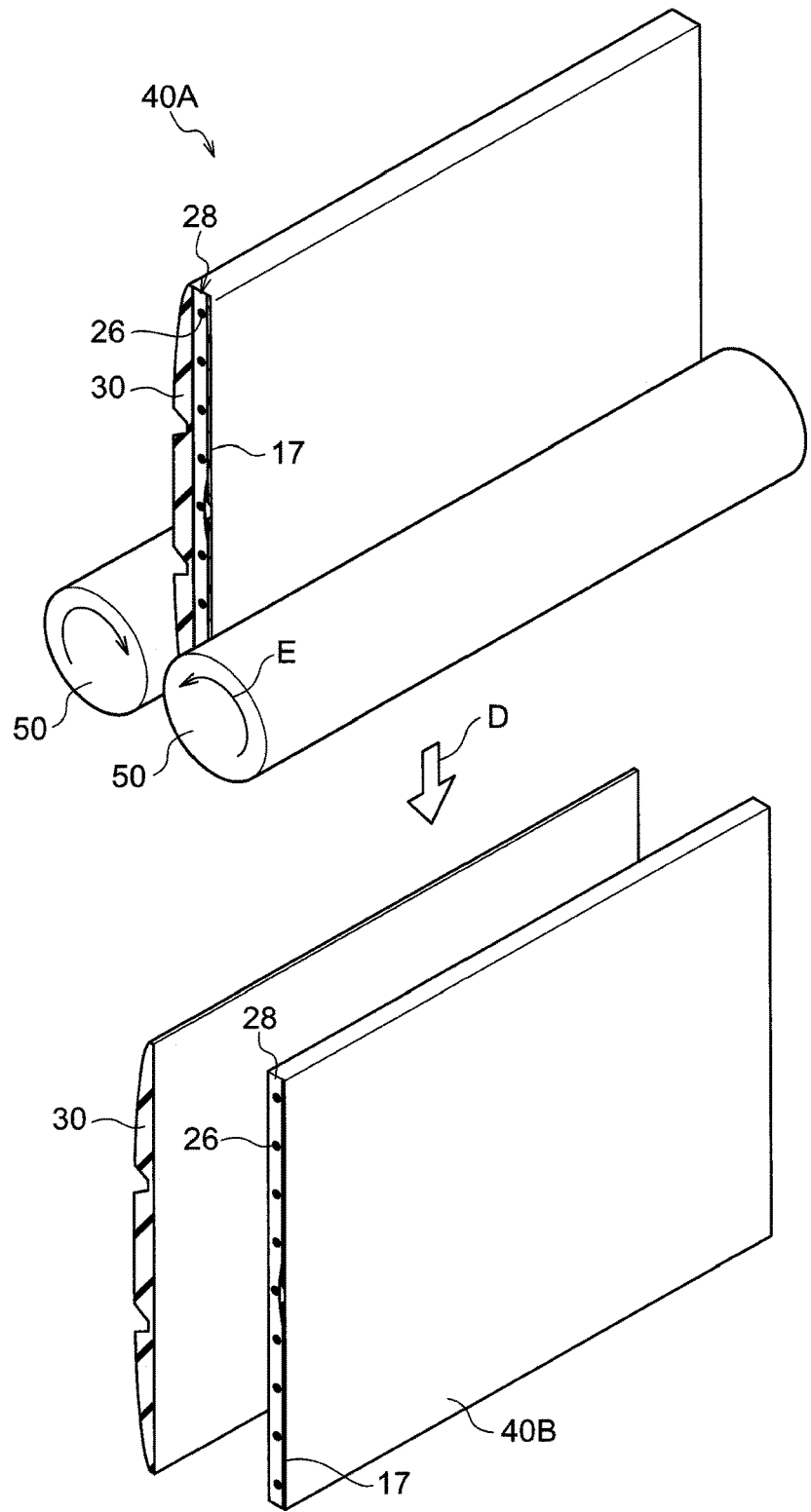
FIG. 6 is a perspective view illustrating a state in which a tread portion of a tire is being compressed by metal rollers to separate a rubber layer.

After the tire piece 40 has been separated further to the lower side than the reinforcing layer 28 of the crown portion 16 in the slicing process, the tread member 30 is separated from the tire piece 40A in a rubber layer separation process. Specifically, as illustrated in FIG. 6, the tire piece 40A formed of the tread member 30, the reinforcing layer 28, and the tire frame member 17 is inserted between a pair of metal rollers 50.

The pair of metal rollers 50 are rotated at the same rotation speed, and a spacing between the metal rollers 50 is set narrower than the plate thickness of the tire frame member 17. Thus, compression force or shear force is applied to the tire piece 40A that has been inserted between the metal rollers 50, due to the metal rollers 50 rotating. Since the rubber forming the tread member 30 has elasticity in comparison to the thermoplastic resin forming the tire frame member 17, a portion of the tread member 30 that is bonded to the tire frame member 17 is compressed under compression force or shear force and breaks, and the tire piece 40A is separated into the tread member 30 and a tire piece 40B. Note that the spacing between the metal rollers 50 may be set wider than the plate thickness of the tire frame member 17, and narrower than the plate thickness of the tire piece 40A.

Note that the tread member 30 and the tire frame member 17 of the tire piece 40A are difficult to separate from each other when the thermoplastic resin forming the tire frame member 17 is softened, and so the ambient temperature in the rubber layer separation process is regulated to be at what is referred to as room temperature, this being from 10° C. to 40° C.

Figure 7:
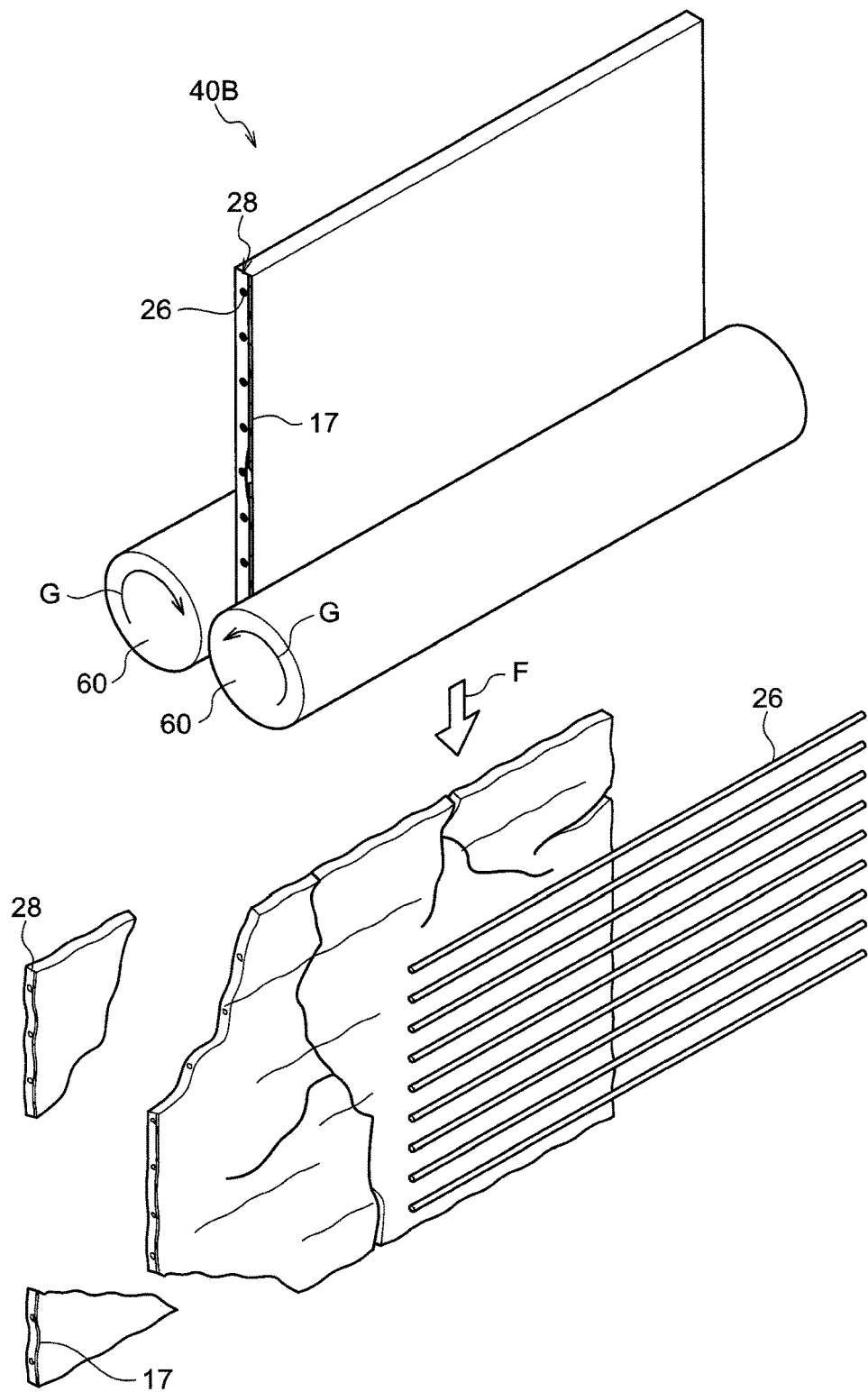
FIG. 7 is a perspective view illustrating a state in which a tire frame member is being crushed by metal rollers to separate a reinforcing member.

Next, the cord 26 of the reinforcing layer 28 is also separated from the tire piece 40B, from which the tread member 30 has already been separated, in a reinforcing member separation process. Specifically, as illustrated in FIG. 7, the tire piece 40B formed of the reinforcing layer 28 and the tire frame member 17 is inserted between a pair of metal rollers 60.

The pair of metal rollers 60 are rotated at the same rotation speed, and a spacing between the metal rollers 60 is set wider than the thickness (diameter) of the cord 26, and at from 2% to 20% of the plate thickness of the tire frame member 17. A metal with substantially the same rigidity as the cord 26, or with lower rigidity than the cord 26, and with higher rigidity than the thermoplastic resin forming the tire frame member 17, is employed for the metal rollers 60.

When the thermoplastic resin forming the tire frame member 17 is softened, the cord 26 and the tire frame member 17 are difficult to separate from each other, and so the ambient temperature in the reinforcing member separation process is also regulated to be at room temperature, this being from 10° C. to 40° C., and is preferably from 20° C. to 30° C.

Since the spacing between the metal rollers 60 is set so as to be much narrower than the plate thickness of the tire frame member 17, compression force is applied to the entire tire piece 40B when the tire piece 40B is inserted between the rotating metal rollers 60. Since the metal rollers 60 have higher rigidity than the thermoplastic resin forming the tire frame member 17, the tire frame member 17 is crushed by the compression force. Since the cord 26 has substantially the same rigidity as, or higher rigidity than, the metal rollers 60, the cord 26 is separated from the tire frame member 17 without being crushed by the metal rollers 60.

In the dismantling method of the tire 10 of the present exemplary embodiment, since the three dimensional tire 10 having a curved surface is cut and made into a plate shape, the tire 10 can be sliced along the interface between the laminated tire frame member 17 and the tread member 30 (covering layer 24), and the thermoplastic resin forming the tire frame member 17 can be dismantled and recycled as a material in material recycling.

By crushing the tire frame member 17 between the metal rollers 60 with the narrow spacing therebetween, the cord 26 laid up on the tire frame member 17 can be removed simply, and the material such as steel that forms the cord 26 can also be recycled as material.

Since the ambient temperature is set at room temperature in the slicing process, the rubber layer separation process, and the reinforcing member separation process, and since the slicer 44 including the endless band knife blade 48 that does not generate frictional vibration heat is employed in the slicing process, the dismantling processes can be efficiently performed without the tire frame member 17 softening.

Other Exemplary Embodiments

In the above exemplary embodiment, the slicing process and so on are performed separately after the tire frame member 17 has been separated into the crown portion 16 and the side portions 14 in the side cutting process. However, the side cutting process may be omitted, and the tire 10 cut along the width direction into a belt shape to perform the dismantling processes without separating the crown portion 16 and the side portions 14 from each other.

Although the cord 26 is separated from the tire frame member 17 in the reinforcing member separation process, the reinforcing member is not limited to the cord 26. For example, the bead cores 15 may be separated from the tire frame member 17 as reinforcing members. It is sufficient that the reinforcing material, such as the cord 26, is a material that has a higher rigidity than the tire frame member 17, and there is no particular limitation regarding the substance.

In the reinforcing member separation process, the tire piece 40B is crushed by the metal rollers 60; however, the tire piece 40B may be pressed and crushed by a press or the like. In the rubber layer separation process and the reinforcing member separation process, the same metal rollers 60 may be employed to compress or to crush the tire pieces 40A, 40B. Note that the rubber layer separation process may be omitted, or the tread member 30 may be sliced by the slicer 44 in the rubber layer separation process without compressing and breaking the tread member 30, thereby separating the tread member 30 from the tire frame member 17.

The entire content of the disclosure of Japanese Patent Application No. 2014-035586 filed Feb. 26, 2014 is incorporated by reference in the present specification.

The invention claimed is:

1. A method for dismantling a tire, comprising:
   providing a tire including a tire frame member formed of a thermoplastic resin, and a reinforcing member laid up at a tire radial direction outside of the tire frame member and formed of a material with a higher rigidity than the tire frame member;
   an opening-out process of cutting the tire along a width direction to make the tire into a belt shape;
   a reinforcing member separation process of crushing the belt shaped tire to separate the tire frame member and the reinforcing member; and
   a pressing process of pressing the belt shaped tire into a plate shape, wherein,
   in the reinforcing member separation process, the tire frame member and the reinforcing member are separated from each other by using metal rollers set with a narrower spacing than a plate thickness of the plate shape of the tire frame member to crush the plate shape of the tire frame member of the tire that has been pressed into the plate shape of the tire, which is separated as a plate shape of a rubber layer, due to a difference of rigidity among the metal rollers, the tire frame member, and the reinforcing member, the rigidity of the metal rollers being higher than the rigidity of the tire frame member, and being lower than the rigidity of the reinforcing member, the tire further comprises the rubber layer that is vulcanization bonded to an outer face of the tire frame member; and the method further comprises a rubber layer separation process of, prior to the reinforcing member separation process, compressing the plate shape of the tire which includes the rubber layer bonded by vulcanization to an outer face of the tire frame member, the tire frame member, and the reinforcing member laid up by bonding or melding to the tire frame member, so as to separate the plate shape of the rubber layer from the plate shape of the tire due to a difference of elasticity between the rubber layer and the tire frame member.

2. The method for dismantling a tire of claim 1, wherein the spacing between the metal rollers is wider than a thickness of the reinforcing member, and is from 2% to 20% of the plate thickness of the tire frame member.

3. The method for dismantling a tire of claim 1, wherein the reinforcing member is a bead or a cord made of metal.

4. The method for dismantling a tire of claim 1, wherein an ambient temperature in the reinforcing member separation process is from 10° C. to 40° C.

* * * * *